United States Patent [19]

Haneda et al.

[11] Patent Number: 5,091,789
[45] Date of Patent: Feb. 25, 1992

[54] MULTICOLOR IMAGE FORMING APPARATUS

[75] Inventors: Satoshi Haneda; Masakazu Fukuchi; Hisashi Shoji, all of Hachioji, Japan

[73] Assignee: Konica Corporation, Tokyo, Japan

[21] Appl. No.: 707,963

[22] Filed: May 22, 1991

Related U.S. Application Data

[63] Continuation of Ser. No. 442,550, Nov. 28, 1989, abandoned.

[30] Foreign Application Priority Data

Nov. 30, 1988 [JP] Japan .................. 63-304737
May 12, 1989 [JP] Japan .................. 1-119594

[51] Int. Cl.$^5$ .......................... H04N 1/00; H04N 1/04
[52] U.S. Cl. .................... 358/401; 358/474; 358/75
[58] Field of Search .......... 358/401, 408, 409, 449, 358/471, 472, 474, 479, 480, 481, 482, 486, 487, 489, 490, 493, 494, 496, 497, 75

[56] References Cited

U.S. PATENT DOCUMENTS 4,462,043  7/1984  Saitou ................. 358/75
4,496,984  1/1985  Stoffel ................ 358/497

FOREIGN PATENT DOCUMENTS 0261782  3/1988  European Pat. Off. .
3525414  1/1986  Fed. Rep. of Germany .

OTHER PUBLICATIONS

Patent Abstracts of Japan, vol. 11 No. 58 (P-550) Feb. 21, 1987. JP-A-61 223857 (Konishiroku Photo Industry) Oct. 4, 1986.

Primary Examiner—Jin F. Ng
Assistant Examiner—Jerome Grant, II
Attorney, Agent, or Firm—Finnegan, Henderson, Farabow, Garrett, and Dunner

[57] ABSTRACT

The invention provides an apparatus for forming a latent image on a photoreceptor. In the apparatus, there are provided an image reader including a scanning device for performing a reciprocal movement along an original document, a reading device for reading an image on the original document and for outputting an image signal in the outward movement of the scanning device, and a memory for storing the image signal; and an image writing device for writing a latent image on the photoreceptor. The image writing device has a first writing mode in which a latent image corresponding to the image signal outputted from the reading device is written in synchronization with the outward movement of the scanning device, and a second writing mode in which a latent image corresponding to the image signal outputted from the memory is written. The scanning device is adapted to perform the backward movement in the second writing mode.

4 Claims, 15 Drawing Sheets

MULTICOLOR IMAGE FORMING APPARATUS

This application is a continuation of application Ser. No. 07/442,550 filed Nov. 28, 1988 now abandoned.

BACKGROUND OF THE INVENTION

The present invention relates to a multicolor image forming apparatus, and especially to a multicolor image forming apparatus, the circumferential length of the photoreceptor of which, being it is larger than the maximum document size, can be reduced.

For instance, when a conventional electrophotographic copier is used to form a multicolor image, processes such as charging, exposure, development, and transfer are repeated for each color and toner images of each color are transferred one another on a recording paper.

For example, an electrostatic latent image is formed at each process mentioned above by light, such a blue, green and red which is obtained through the color separation filters, and latent image is developed by yellow, magenta, cyan, and black toner. Thus the toner image of each color is formed on a photoreceptor surface and transferred to a recording paper, and repeating this process a multicolor image is formed on a recording paper.

But such a multicolor image forming method has several disadvantageous points which will be explained as follows. (1) The image must be transferred to a recording paper each time development is finished. For the reason, the size of the apparatus becomes large, and in addition it takes a long time to form an image. (2) When the image forming process is repeated, the positions of each color image tend to slip.

In order to improve this, there is a method for multicolor image forming, explained as follows. After a toner image is formed on a photoreceptor, furthermore a latent image is written on the photoreceptor with toner image and a toner image of different color is formed on the photoreceptor with former toner image, (in this case the toner images are superimposed, but each toner is not necessarily superimposed). This process is repeated. In other words, this multicolor image forming apparatus is the type in which each color toner is superimposed on the photoreceptor and transfer to a recording paper is conducted only once. This method can solve some of the above-mentioned problems. However, even by this method there are some problems such as disturbing the toner image obtained in a former stage at a subsequent developing stage or losing the color balance in the multicolor image because the toner in the former stage is mixed into that of the subsequent stage.

In order to avoid such defects, the following multicolor image forming method is proposed. The details of the method are as follows. The photoreceptor is kept out of contact with the developer layer which is to develop the electrostatic latent image formed on the photoreceptor, and the latent image is developed by toner in the developer which is cause to fly by the action of a D.C. bias current or a D.C. bias current superimposed with an A.C. component current.

According to the method, the images on the photoreceptor are not disturbed because the developer layer does not come into contact with the toner image formed beforehand.

The principle of this image forming method will be explained referring to the flow chart in FIG. 1.

FIG. 1 shows the variation of the photoreceptor surface potential. This is an example in which the electric polarity is positive.

PH represents the exposed portion of the photoreceptor. DA represents the non-exposed portion of the photoreceptor. DUP represents the raised electric potential caused by the positively charged toner T which adheres to the photoreceptor in the first development. CUP represents the raised electric potential of the exposed portion PH caused by the second charging. The photoreceptor is uniformly charged by a Scorotron charger and given a constant surface potential E. The surface potential is decreased to close to zero at the exposed portion PH by the first exposure conducted by an exposure source such as a laser, cathode-ray tube, a liquid crystal shutter, LED, or the like.

When a positive bias potential, whose D.C. component current is approximately equal to the surface potential E of the portion where exposure has not been conducted, is given to the developing apparatus, the positively charged toner T in the developing apparatus adheres to the exposed portion PH where the electric potential is relatively low. The first visible image is formed in this way.

The electric potential of the region where the visible image is formed rises by the amount of DUP because positively charged toner T adheres to the region. At the next stage, the second charging is carried out by the charger and electric potential further rises by the amount of CUP so that the initial surface potential E is obtained in this portion as well as the portion DA where exposure is not conducted.

Then, the second exposure is carried out on the photoreceptor surface where the surface potential E is uniform, and an electrostatic latent image is formed. After the same developing operation is conducted, the second visible image is obtained.

The multicolor toner image is obtained on the surface of the photoreceptor by repeating the process mentioned above. The multicolor image is obtained by transferring the toner image onto a recording paper and fixing it by heat or pressure.

The toner and electric charge which remain on the photoreceptor are cleared in preparation for the next multicolor image forming.

The discharge process by an exposure lamp or corona discharge may be conducted before every charging process.

The light source for exposure used to expose images may be either the same or different each time.

In the above-mentioned multicolor image forming method, toner images of 4 color, such as yellow, magenta, cyan, and black, are superimposed on the surface of the photoreceptor in many cases. The reason will be explained as follows.

A black image is theoretically obtained by superimposing 3 primary colors of yellow, magenta, and cyan. But a clear black image in accordance with requirements for letters and pictures is difficult to obtain by only 3 primary colors because the primary color toner for practical use does not have an ideal absorption wave length region and each toner images of 3 primary colors is difficult to register each other in proper position. In order to solve the problem, black is used in addition to the 3 primary colors, and 4 color toner images are superimposed to obtain a multicolor image similar to the document.

In the above-mentioned multicolor image forming method, a reverse developing method is used as an electrostatic latent image developing method.

In the reverse developing method, it is sufficient to expose only the portions on the photoreceptor where toner images are formed. It is not necessary in this method to expose the background, leaving unexposed spaces as in the normal developing method. Therefore, it is comparatively easy to form a latent image on a photoreceptor on which toner images have been already formed.

An advantageous point of this method is that the photoreceptors's life is lengthened. Furthermore, since electric charging after the second charging is conducted with the same polarity as the toner, no trouble is caused in electrostatic transfer.

As methods to form a latent image for multicolor image forming, two methods other than the above-mentioned method, in which the photoreceptor is uniformly charged and the electrostatic latent image is formed by exposure, are proposed by the inventors. They are the method in which the latent image is formed by charging a dielectric layer imagewise directly with a multineedle electrode and the method in which a magnetic latent image is formed by a magnetic head.

The above-mentioned methods are all able to express gradation. This type of gradation expression is what is called multistep gradation, and a large capacity for image data is needed.

In order to solve this problem, a new image data forming method is proposed which will be explained below. Each pixel is recorded in the binary system or the multiple system. The gradation is expressed in the matrix of each pixel. As a result, a large capacity for image data is unnecessary.

FIG. 8 is a schematic illustration which shows a three color image forming apparatus.

When the photoreceptor 51 makes one revolution, toner images of three colors of yellow, magenta, and cyan are superimposed.

In FIG. 8, the photoreceptor 51 is a light sensitive drum which is rotated in the arrowed direction.

As shown in FIG. 8, the scoroton charger 52, the exposure unit 53, and the developing unit 54 are arranged around the circumferential surface of the photoreceptor 51 in order to form yellow toner images. The scorotron charger 56, the exposure unit 57, and the developing unit 58 are serially arranged in order to form magenta toner images. Furthermore, the scorotron charger 60, the exposure unit 61, and the developing unit 62 are serially arranged in order to form cyan toner images. Accordingly, three color toner images are superimposed on the surface of the photoreceptor 51 when the photoreceptor makes one revolution. The numerals 55, 59, and 63 are developing sleeves. The numeral 64 is a recording paper feeding unit. The numeral 66 is a transfer electrode. The numeral 67 is a paper separating electrode. The numeral 68 is a fixing unit. The numeral 70 is a cleaing unit.

This apparatus can process rapidly, but it needs three pairs of charging, exposing, and developing units. As a result, the apparatus becomes large and its cost is increased. In order not to increase the cost of the apparatus and to make it compact, an image forming apparatus shown in FIG. 5 is proposed in which an exposure unit is used in common among three colors and each color image is superimposed by a plurality of revolutions of the photoreceptor.

The apparatus is used in the example of the present invention explained later. FIG. 5 is a schematic illustration of the multicolor image forming apparatus. FIG. 6 shows a laser unit which is applied to the image forming apparatus shown in FIG. 5. FIG. 7 shows a developing unit used in the image forming apparatus shown in FIG. 5.

In FIG. 5, the photoreceptor 11 rotates in the arrowed direction. It is uniformly charged by the scorotron charger 12. The surface of the photoreceptor which is uniformly charged, is exposed by an image exposure means to form an electrostatic latent image.

For instance, the laser unit 14 shown in FIG. 6 is used as the exposure unit and the photoreceptor is exposed to laser beam L to form electrostatic latent images corresponding to each color on the photoreceptor 11.

The electrostatic latent image corresponding to yellow is formed by being exposed to a laser beam modulated by the data relating to yellow.

The electrostatic laten image corresponding to yellow is developed by the first development unit 15 and the first toner image (yellow toner image) is formed on the photoreceptor 11.

Without this first toner image being transferred onto recording paper P, the photoreceptor 11 is charged by the scorotron charger 12 again.

Then, the laser beam is modulated by the data relating to magenta and the photoreceptor 11 is exposed to the modulated laser beam. The electrostatic latent image of magenta is formed in this way. This latent image is developed by the developing unit 16 and the second toner image (magenta toner image) is formed.

The latent image is developed by the third developing unit 17 in the same way. Then, the latent image is developed by the fourth developing unit. As a result, the third toner image (cyan toner image) and the fourth toner image (black toner image) are formed. The toner images are superimposed in order on the photoreceptor in this way and finally four color toner images are formed.

After the photoreceptor 11 is neutralized by the neutralizing lamp 40, these four color toner images are charged again by the charger 19 and transferred by the action of the transfer electrode 24 onto a recording paper P delivered from the paper feeding unit 20. The photoreceptor 11 is preferably charged by the charger 19 to the same electric potential as by the scorotron charger 12. By equalizing electric potential in this way, the condition of the toner which is charged again can become equal and toner image transfer can be conducted smoothly. It is desirable that the charger 19 is a scorotron charger.

The numeral 23 is a paper feeding roller. The numeral 22 is a guide plate. After recording paper P which holds the transferred toner image is separated by the paper separating electrode 25 from the photoreceptor 11, it is conveyed by the guide 26 and the conveyance belt 27 to the fixing rollers 28 and fixed by heat, then delivered to the paper delivery tray 29.

After toner images are transferred to recording paper P, the photoreceptor 11 is neutralized by the neutralizer 31 which was not used while toner images were being formed. Then the toner which remains on the surface of the photoreceptor is removed by the blade 32, a fur brush or a magnetic brush in the cleaning unit 30 to prepare for the next multicolor image forming.

However, in the above-mentioned image forming apparatus, the circumferential length of the photoreceptor (in the shape of drum or belt) is determined to be the length corresponding to the maximum image size, or the stroke length of the optical system for copying the maximum size document including the length corresponding to the back scanning of the optical system. Accordingly, the disadvantage of the apparatus is that the photoreceptor has a large portion which is not used when a small size image is formed on the photoreceptor.

In view of the fact mentioned above, a method is proposed in which the rotating speed of the photoreceptor is changed according to the image size. Refer to Japanese Patent Publication Open to Public Inspection No. 223857/1986. According to the above-mentioned proposal, the photoreceptor can be made compact, but the disadvantage of the proposal is that the printing speed slows down when a large size document is copied.

SUMMARY OF THE INVENTION

The object of the present invention is to eliminate the disadvantage of the conventional copier and to provide an efficient multicolor image forming apparatus which utilizes the photoreceptor efficiently by reducing the circumferential length of the photoreceptor, which used to have a wide blank space even when an image of maximum size is copied, and which can increase the printing speed when a smaller size image is printed.

The present invention relates to a multicolor image forming apparatus in which the circumferential length of the photoreceptor does not need the additional circumferential length of the photoreceptor corresponding to the time which is needed for the optical system to return to the starting position.

The advantage of the present invention will be described as follows.

Generally speaking, concerning the size of document, the sizes of A3, A4, B4, and B5 are usually used in an office. Therefore, a printer or a copier must be applied to the maximum size of paper with regard to the circumferential length and the width of the photoreceptor. In other words, the circumferential length of the photoreceptor must be longer than the paper length.

The circumferential surface of the photoreceptor must have some space for the standard toner image, which is called the patch space for toner concentration control, a space corresponding to the time which is needed for the return stroke of the optical scanning system, and a space corresponding to the time to process the input image data. Therefore, the circumferential length of the photoreceptor must be a little longer than the length of the document of the maximum size. The additional circumferential length is largely occupied by the length corresponding to the time for the optical system returning motion.

For example, although the length of A3 size paper is 420 mm, the necessary circumferential length of the photoreceptor is 420 mm + $\alpha$. In this case, $\alpha$ means the length necessary for the reasons mentioned above. For that reason, the problem has occurred that the size of the apparatus becomes large.

The summary of the present invention is as follows.

The present invention relates to a multicolor image forming apparatus in which the above-mentioned $\alpha$ is reduced. The multicolor image forming apparatus in which a latent image is formed on a photoreceptor synchronizing with the reciprocating motions of an optical scanning system in a reading unit and the latent image is developed to form a toner image on the photoreceptor, and in which the above-mentioned processes are repeated and each color toner images is superimposed on the photoreceptor, is characterized in that the image data of the different color (sometimes same color) from the toner image already made which is stored in a memory unit in synchronism with a readout scanning motion, is written on the photoreceptor, corresponding to previous image data which was written on the photoreceptor, when the optical system is on the return stroke in the readout scanning motion. The memory unit includes a selection member selecting the image data to be stored therein. The object is to increase the printing speed by the improvment mentioned above.

DETAILED DESCRIPTION OF THE INVENTION

In the following, several preferred examples are described to illustrate the invention. However, it is to be understood that the invention is not intended to be limited to the specific examples.

First of all, the method to form image data will be explained.

In the multicolor image forming apparatus of the present invention, the output signal from the image reading element in scanning a multicolor document, a transmitted signal from other apparatus such as a facsimile, or the data stored in a memory unit, and the like are utilized as the image forming data.

The image data are composed of Yi, Mi, and Ci of three primary colors, which are yellow, magenta and cyan, and BKi of black data.

When multicolor image forming is conducted, the image data are inputted to the calculating part of the color correction unit. For instance, the desired four color data are calculated by the following formulae [I].

Formulae [I]

$$Ym = \alpha^1 Yi - \beta^1 \min[Yi, Mi, Ci]$$

$$Mm = \alpha^2 Mi - \beta^2 \min[Yi, Mi, Ci]$$

$$Cm = \alpha^3 Ci - \beta^3 \min[Yi, Mi, Ci]$$

$$BKm = \alpha^4 BKi + \beta^4 \min[Yi, Mi, Ci]$$

Herein, Ym, Mm, and Cm are the data after being calculated. Yi, Mi, and Ci are inputted image data. $\alpha^1$, $\alpha^2$, $\alpha^3$, $\alpha^4$, $\beta^1$, $\beta^2$, $\beta^3$, and $\beta^4$ are color correction coefficients based on the external factors such as the developing conditions. The min. [Yi, Mi, Ci] shows the minimum density value among the three primary colors of yellow, magenta, and cyan.

In order to deepen understanding of formulae [I], the following explanation will be made under the conditions that $\alpha^1$ to $\alpha^3$ and $\beta^1$ to $\beta^4$ are all 1 and $\alpha^4 = 0$.

Figure 3:
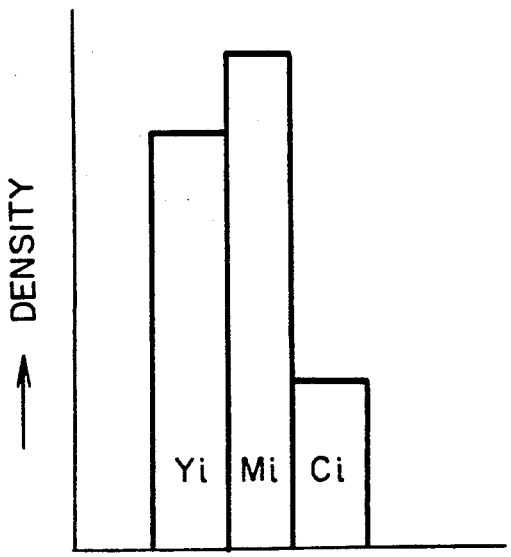
FIG. 3 and FIG. 4 are histograms which show color density.

As shown in FIG. 3, when the image color having the minimum density value is cyan (Ci), the black component can be obtained by adding up the density value obtained by subtracting the density value of cyan from the each density value of the three primary colors. This calculation is based on the principle of the subtractive color system.

Figure 4:
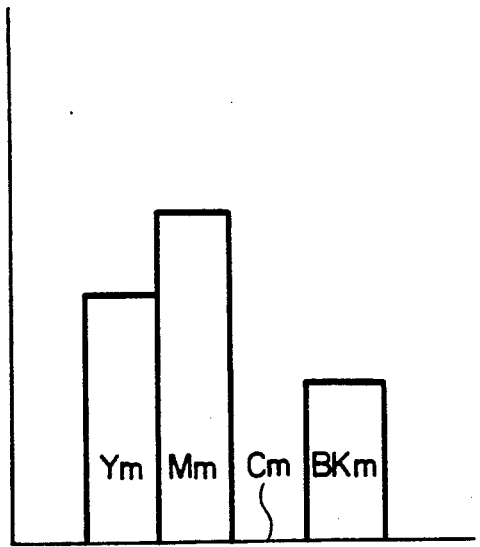

The black component is added to the black data BKi and it makes the black image data shown in FIG. 4. The density value of cyan is subtracted from the density values of the three primary colors, and the obtained results are made the three primary color image data as shown in FIG. 4. In this way, color balance is improved during development, toner consumption is reduced, and working efficiency is increased.

Figure 1:
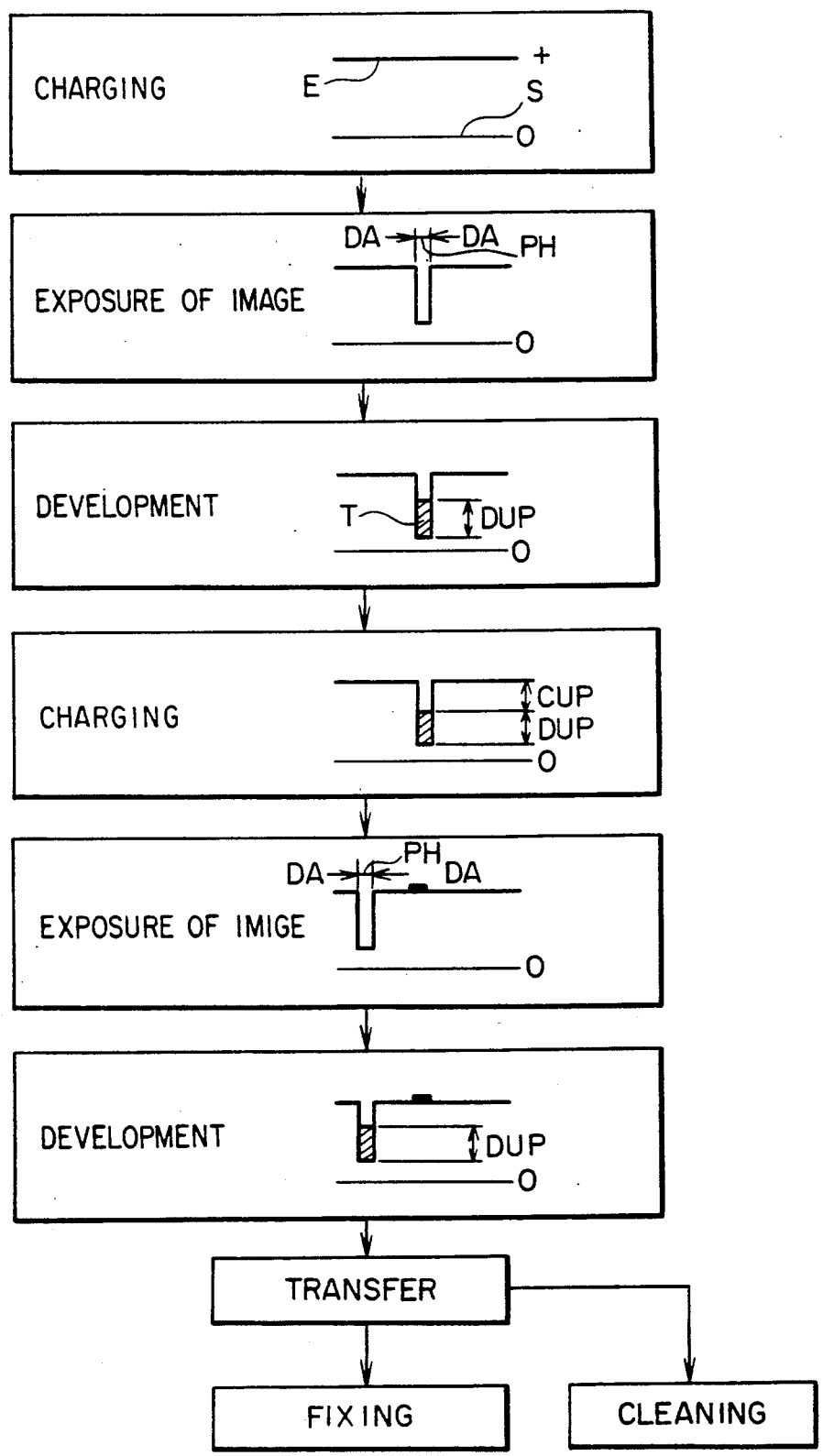
FIG. 1 is a drawing to shown the principle of image forming.
Figure 2:
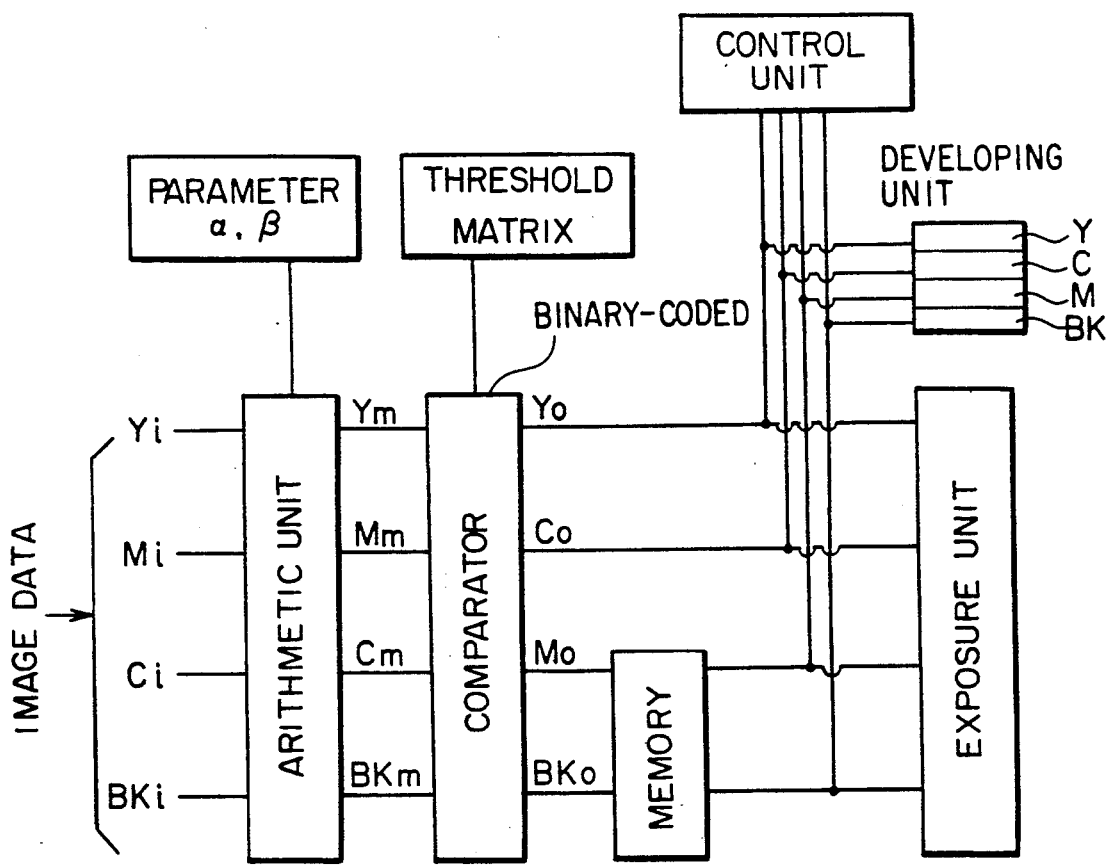
FIG. 2 is a block diagram which shows the calculating part for color correction.

The four color data, Ym, Mm, Cm, and BKm which were color-corrected in the calculating part in FIG. 2, are compared with the threshold matrix which will be explained later. As a result, binary four color data $Y^0$, $M^0$, $C^0$, and $BK^0$ can be obtained.

When toner images are formed in order of yellow, magenta, and cyan, the image data of magenta and black are once stored in the memory and outputted to the exposure system according to the order from the control unit, and electrostatic latent images are formed on the photoreceptor. The latent images are developed by the 4 kinds of developing units which are driven by the order from the aforesaid control unit, and contain yellow, magenta, cyan, and black toner. It is preferable that development is carried out by the means of noncontact reverse development.

In this way, 4 color toner images are superimposed on the photoreceptor and transferred and fixed onto a recording paper which is conveyed by conveyance rollers synchronized with the rotation of the photoreceptor.

When the frame memory is used, printing can be conducted without being synchronous with the reading means. However, it is expensive to let it have the frame memory to store data corresponding to a plurality of documents. For that reason, while the reading out the image is synchronized with the forming of the image, the read out image data corresponding to the next color image is stored in the frame memory and used for forming the next image.

In this example, only the frame memory for one color and one frame of A3 which is the maximum image size, is to be prepared.

When a document size is A4, reading out and forming an image of the document are conducted synchronously with each other and the signal obtained by reading out one color image is once stored in the frame memory and then the stored signal is used in the second writing to form the image. By the means mentioned above, two identical toner images can be formed on the photoreceptor. The procedure is repeated 3 to 4 times for each color and two frames of multicolor image are formed. Then the images are transferred onto a recording paper which was conveyed being synchronized with forming of each image, and the recording paper is delivered from the apparatus.

Figure 5:
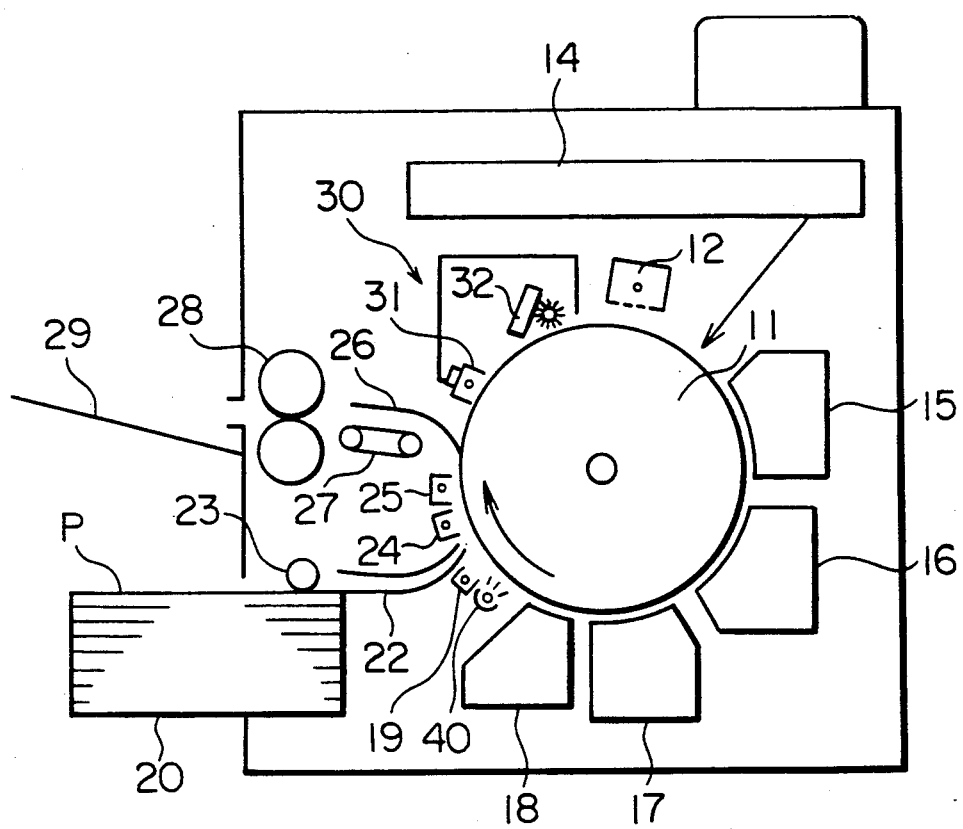
FIG. 5 is a schematic illustration which shows the outline of a multicolor image forming apparatus.
Figure 6:
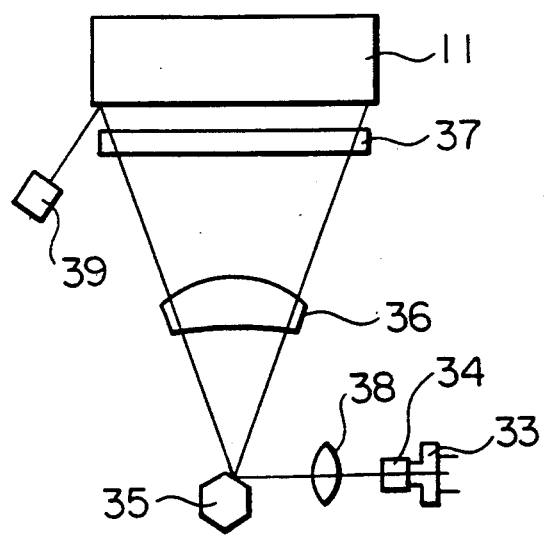
FIG. 6 is a schematic illustration which shows a laser unit.
Figure 7:
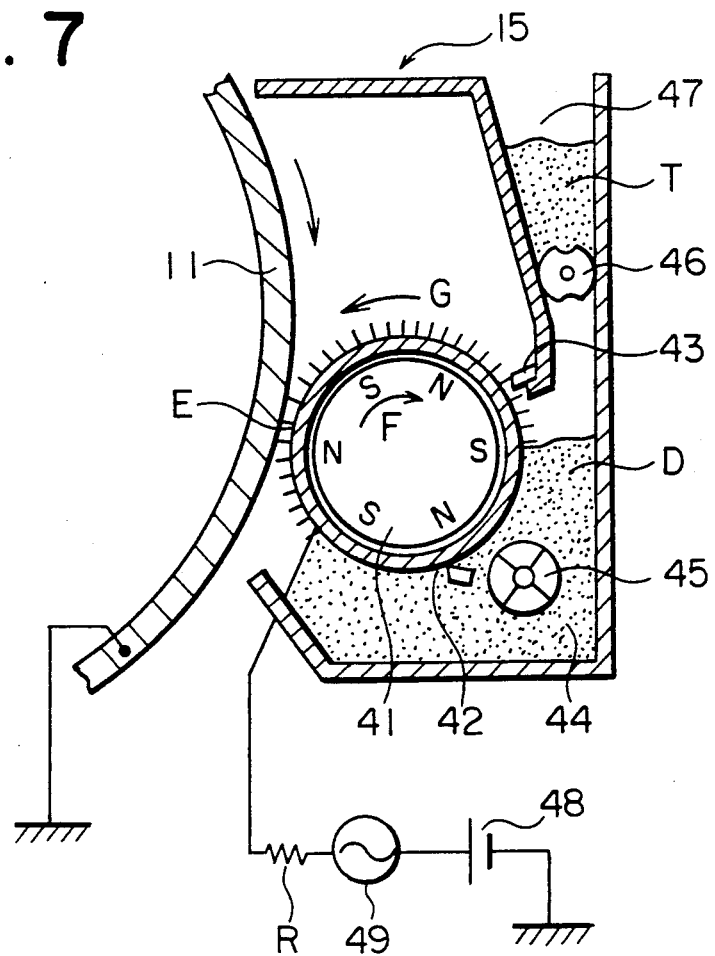
FIG. 7 is a schematic illustration which shows a developing unit.
Figure 8:
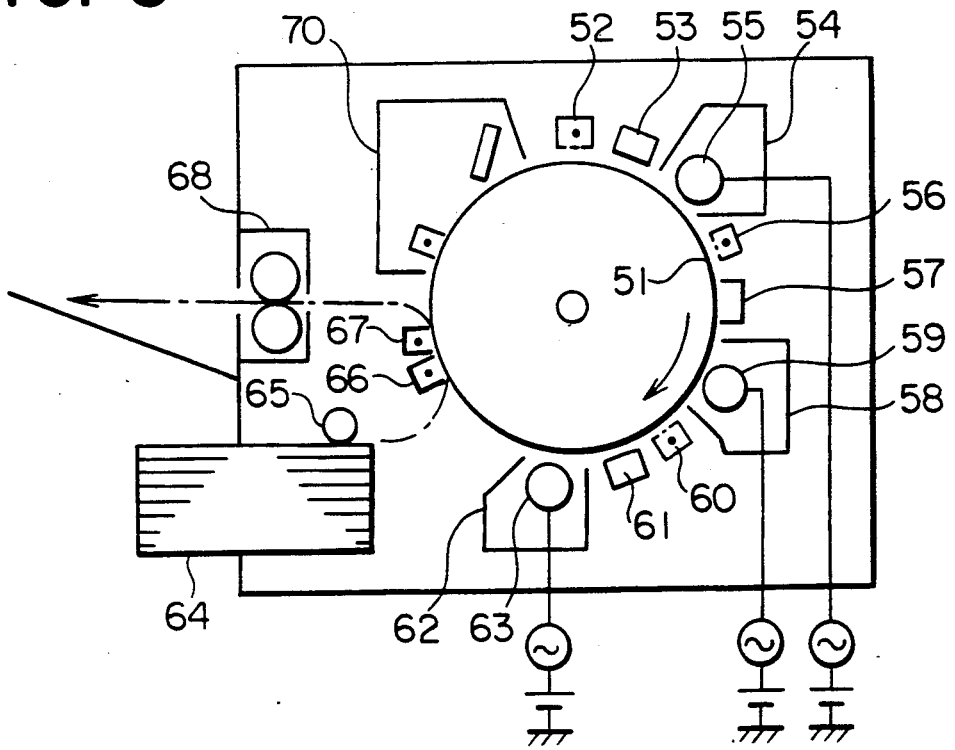
FIG. 8 is a schematic illustration which shows an another example of a multicolor image forming apparatus.
Figure 10:
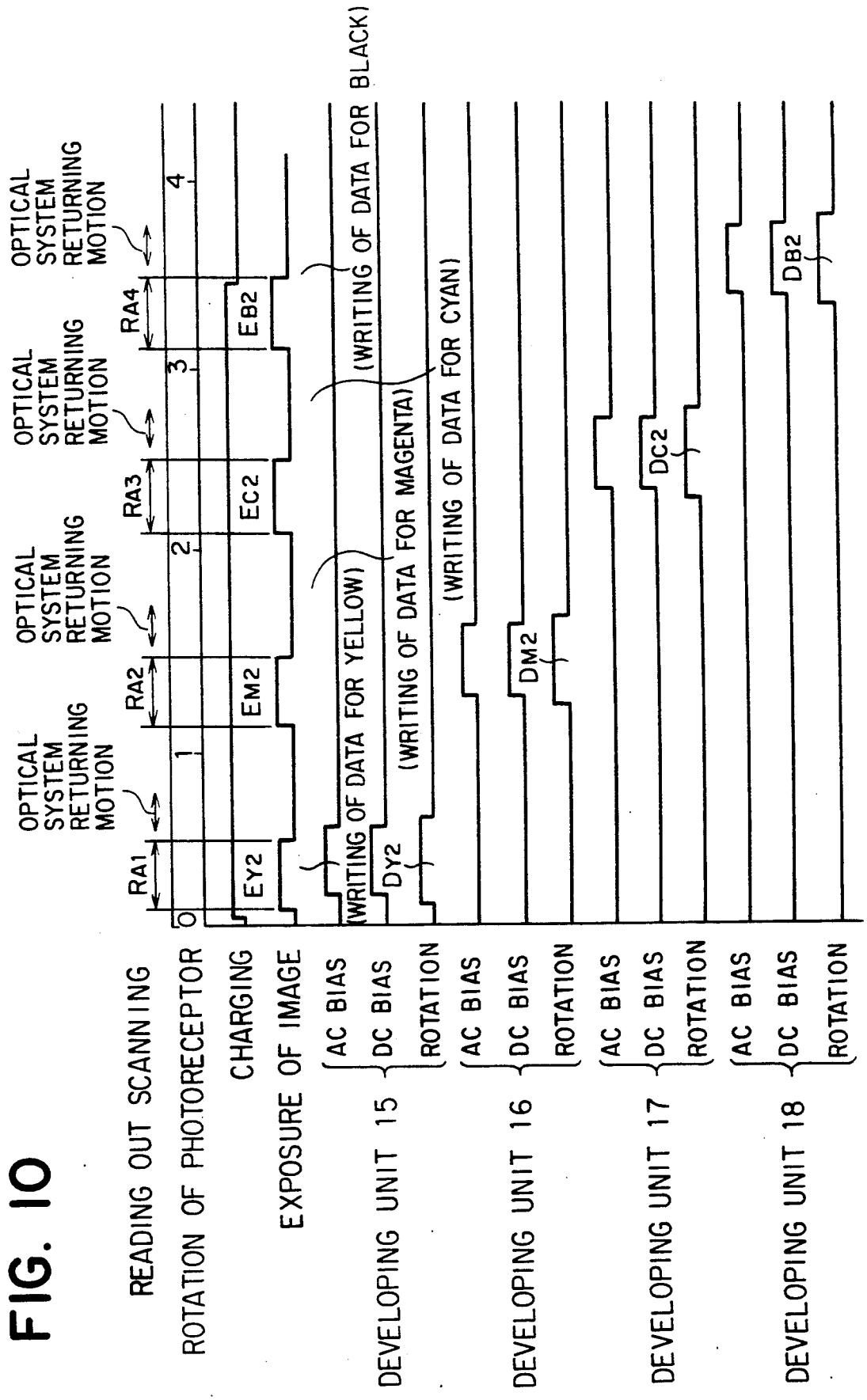
FIG. 10 is a time chart of a multicolor image forming apparatus, wherein a document of A4 size is applied and a memory unit is not used in the case of A4 document.
Figure 11:
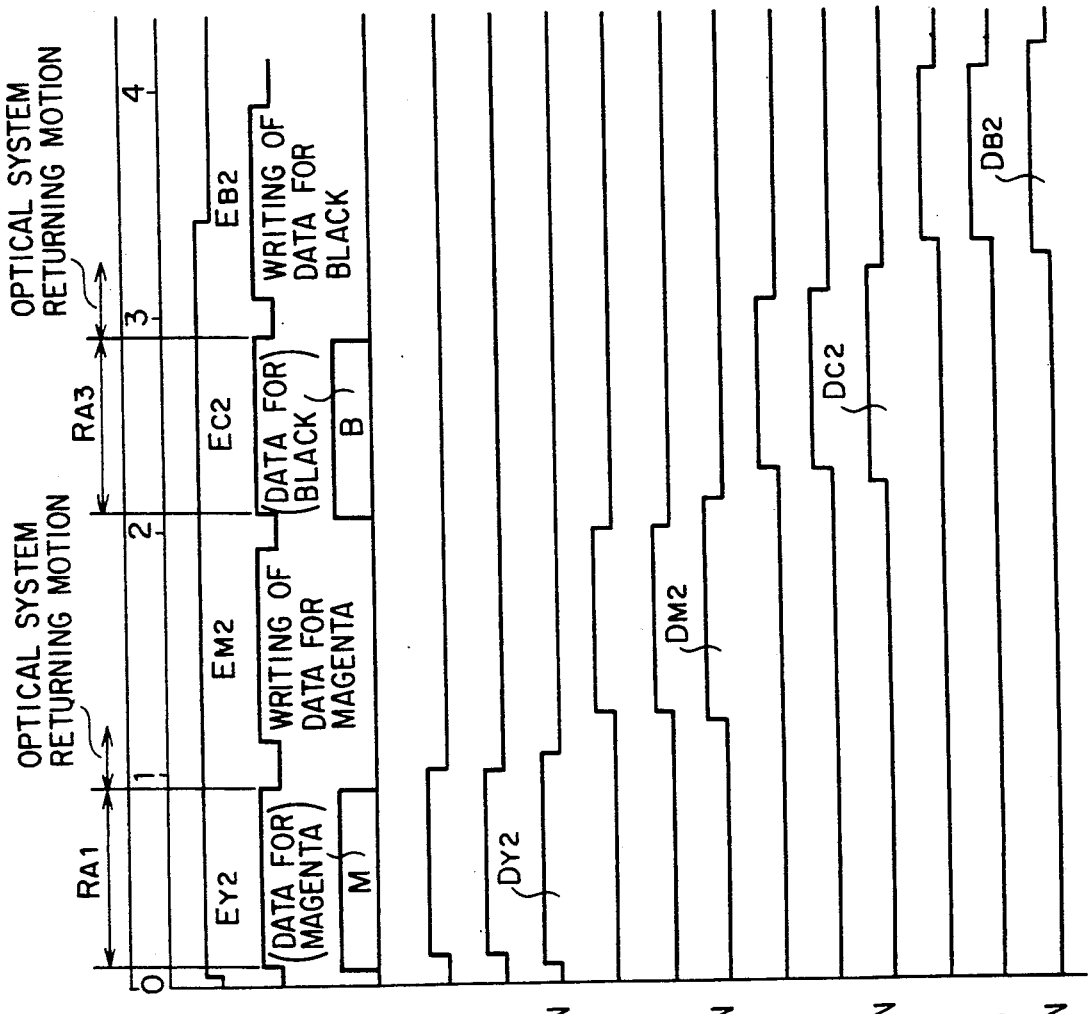
FIG. 11 is a time chart of a multicolor image forming apparatus, wherein a document of A3 size is applied and a memory unit is used.

FIG. 5 is a sectional illustration of the example of a multicolor image forming apparatus. FIG. 6 is a laser device which is applied to the image forming apparatus shown in FIG. 5. FIG. 7 is a developing unit which is used in the image forming apparatus shown in FIG. 5. FIG. 10 is a time chart for a small document size (A4 size). FIG. 11 is a time chart for a large document size (A3 size).

Since a detailed explanation about the drawings was already made, it will be omitted here. The diameter of the photoreceptor 11 on which images are formed, is determined to be 140 mm so that it can process the maximum size of A3.

The scanning is conducted by the reading out device being synchronized with the image exposure. In the case of a document of A4 size, the scanning system can return to its original position by the time the position of the exposure on the photoreceptor returns again to its writing position. But in the case of a document of A3 size, the scanning system must go faster in order to return to its original position by the time the position of the exposure on the photoreceptor returns again to its writing position.

So, in the case of a document of A3 size, the scanning system is forced to overwork, and it is difficult to take counter measures against vibration caused by the high speed reciprocating motion of the scanning system.

Formerly a proposal was made. The proposal was that in the case of scanning an A3 size document, the photoreceptor 11 made two revolutions while the scanning system returned to the original position, and in the case of scanning an A4 size document, which is smaller than an A3 size, the number of revolutions of the photoreceptor 11 was the same as that of the strokes of the scanning system. Concerning the invention, refer to Japanese Patent Publication Open to Public Inspection No. 223857/1986. The disadvantage of the invention is that the printing speed slows down when an A3 size is copied.

The example of the present invention will be explained as follows both in the case of a document of A3 size and in the case of a document of A4 size.

EXAMPLE 1

In FIG. 5, the photoreceptor 11 is a selenium photoreceptor drum which rotates at a circumferential linear speed of 140 mm/sec and whose diameter is 140 mm. The surface of the photoreceptor is uniformly charged by the scorotron charger 12 to the electric potential of +800 V. This uniform electric charge is exposed to light image by an exposure means and an electrostatic latent image is formed on the photoreceptor.

In this example, a semiconductor laser device 14 in FIG. 6 is used as the exposure system. The photoreceptor is exposed to a laser beam from the laser device, and the first electrostatic latent image is formed on the photoreceptor, then the photoreceptor is serially exposed to a laser beam modulated by the data in the memory, and the electrostatic latent image corresponding to each color is formed on the photoreceptor 11.

The detail of the semiconductor laser device 14 is shown in FIG. 6. A laser beam L emitted from the laser semiconductor 33 is modulated according to the above-mentioned binarized image data. The modulated laser beam passes through the collimator lens 34 and the cylindrical lens 38 and is deflected by the rotating mirror 35, the shape of which is a hexahedron. After that, the laser beam passes through the f-$\theta$ lens 36 for focusing and the cylindrical lens 37 and scans the surface of the photoreceptor 11 at a constant speed to expose imagewise in order to form an electrostatic latent image. The numeral 39 is an inspection unit which determines the writing position of laser beam L.

Figure 9:
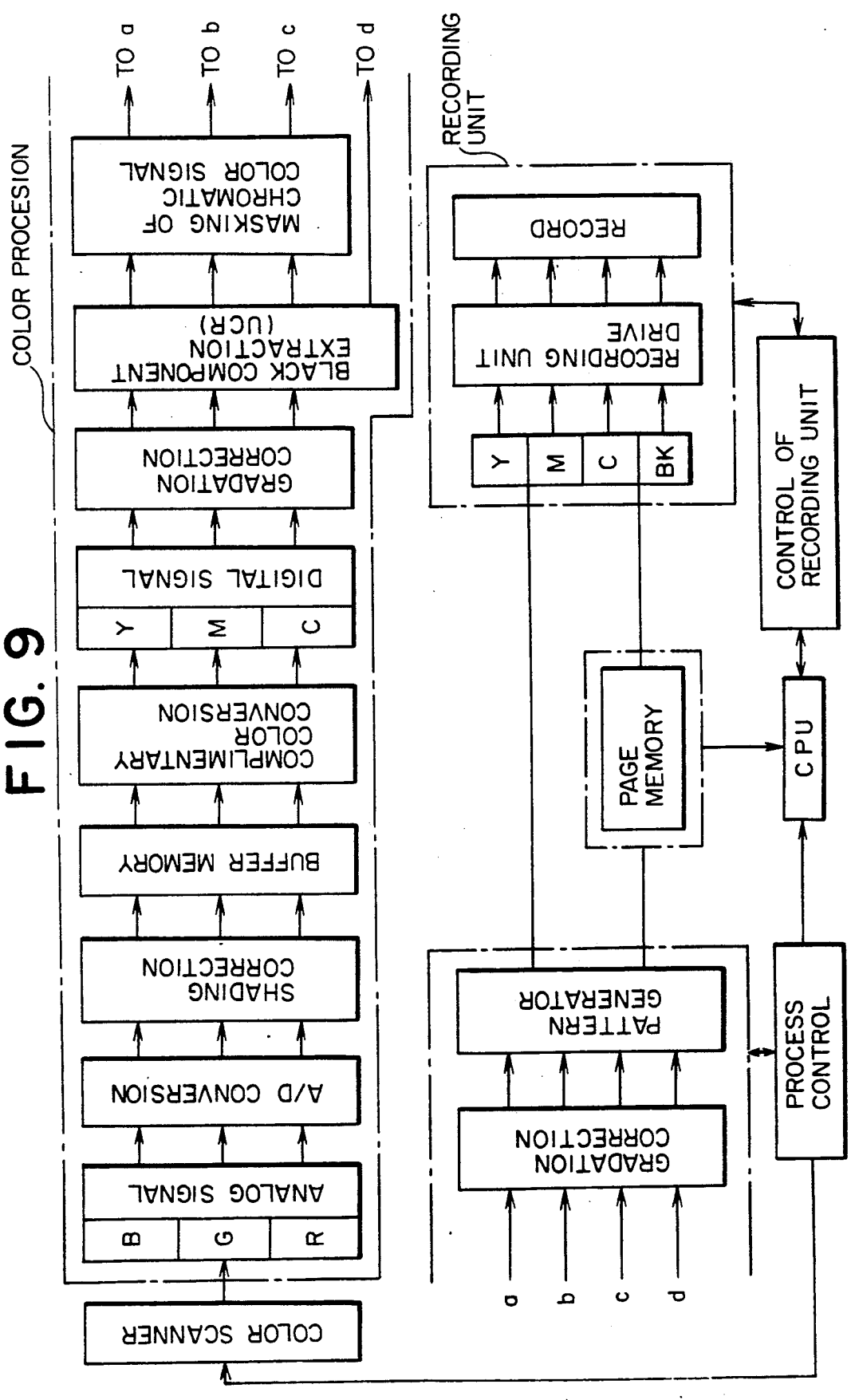
FIG. 9 is a block diagram which shows the outline of a color image forming system.

Referring to FIG. 9, a color image forming system with the input system will be explained next.

A recording unit, a dot pattern memory, and an image forming process are driven and controlled by the signals from the CPU. For example, the light reflected from the document is color separated in accordance with movement of the exposure system 72, 74, which are consisted of the lamps 70, 70' and the mirrors 71, 73, in FIG. 14, and three CCD image sensors 4, 5, 6 read out color information of B (blue), G (green), and R (red) of the image on the document of A3 size, moving in the lateral direction (the primary scanning direction), and output analog signals.

Shading correction is conducted to these signals after A/D conversion was made to eliminate distortion caused by the optical system. At the same moment, the signals are temporarily inputted to the buffer memory to make the signals of B, G, and R correspond to same image position. Then the B, G, and R signals from the buffer memory are converted to complimentary color signal of Y (yellow), M (magenta), and C (cyan), and after the gradation is corrected, the black component is extracted (UCR) from the data of Y, M, and C, and are separated into color components and non color components.

The colors of Y, M, and C, which are the color components, are corrected and their gradation is corrected together with the black component (BK). After that, the color signals are inputted to the pattern generator (PG). The signals are converted into digital dot pattern signals after processed by the dither method. The Y dot pattern signal which is written first, is outputted to the recording apparatus through the line memory which is necessary for the buffer without being stored in the page memory, wherein the process is different from that shown in FIG. 2. Then, writing and image forming are conducted almost synchronously with the readout of signals. On the other hand, the writing of M dot pattern installed in the frame memory for A3 size and its image forming are made synchronously with the movement of the photoreceptor while the optical system is on the returning stroke. At the next stage, the writing of C dot pattern and the storage of the BK dot pattern in the frame memory are conducted being synchronized with the readout in the same way. The BK dot pattern is written synchronously with the movement of the photoreceptor while the optical system is on the returning stroke.

The outline of the system composition is as is explained above. The circumference of the photoreceptor can be reduced by a length corresponding to the time needed for the scanning system to return.

In FIG. 10, a time chart for copying a document of A4 size is shown. It is shown in the time chart that every means is driven at a high level. $EY_2$, $EM_2$, $EC_2$, and $EB_2$ are timings to write by an exposure means the information of yellow, magenta, cyan, and black, which was read out at $RA_1$, $RA_2$, $RA_3$, and $RA_4$. Development of yellow, magenta, cyan, and black is conducted by the developing units 15, 16, 17, and 18 according to the information at the timing of $DY_2$, $DM_2$, $DC_2$, and $DB_2$.

In FIG. 11, a time chart for copying a document of A3 size is shown. Every means is driven at a high level. In the same way as that shown in FIG. 10, $EY_2$, $EM_2$, $EC_2$, and $EB_2$ are timings to write by an exposure means the information of yellow and magenta which was read out by $RA_1$ and the information of cyan and black which was read out by $RA_3$. Development of yellow, magenta, cyan, and black is conducted by the developing units 15, 16, 17, and 18 according to the information of the timing $DY_2$, $DM_2$, $DC_2$, and $DB_2$. These time charts show the multicolor image forming process which is carried out in a series.

Therefore, as shown in the time charts in FIG. 10 and 11, in the case of a document of A4 size, the image readout scanning and image exposure are conducted every revolution of the photoreceptor without using the frame memory. In the case of a document of A3 size, the readout scanning and image exposure on the photoreceptor drum is conducted at the first revolution of the photoreceptor, and the optical system makes a return stroke at the second revolution of the photoreceptor while the photoreceptor is exposed to form an image according to the data sent from the frame memory. In other words, one image readout scanning is conducted every two revolutions of the photoreceptor and one image exposure is conducted every one revolution of the photoreceptor. The circumference of the photoreceptor can be shortened to make the apparatus compact by changing the process of superimposing images on the photoreceptor according to the document size.

In this example, the frame memory is not used when a document of A4 size is copied. But it is possible to conduct one image readout scanning every two revolutions of the photoreceptor, wherein the frame memory is used in the same way as when a document of A3 size is copied.

EXAMPLE 2

Figure 12:
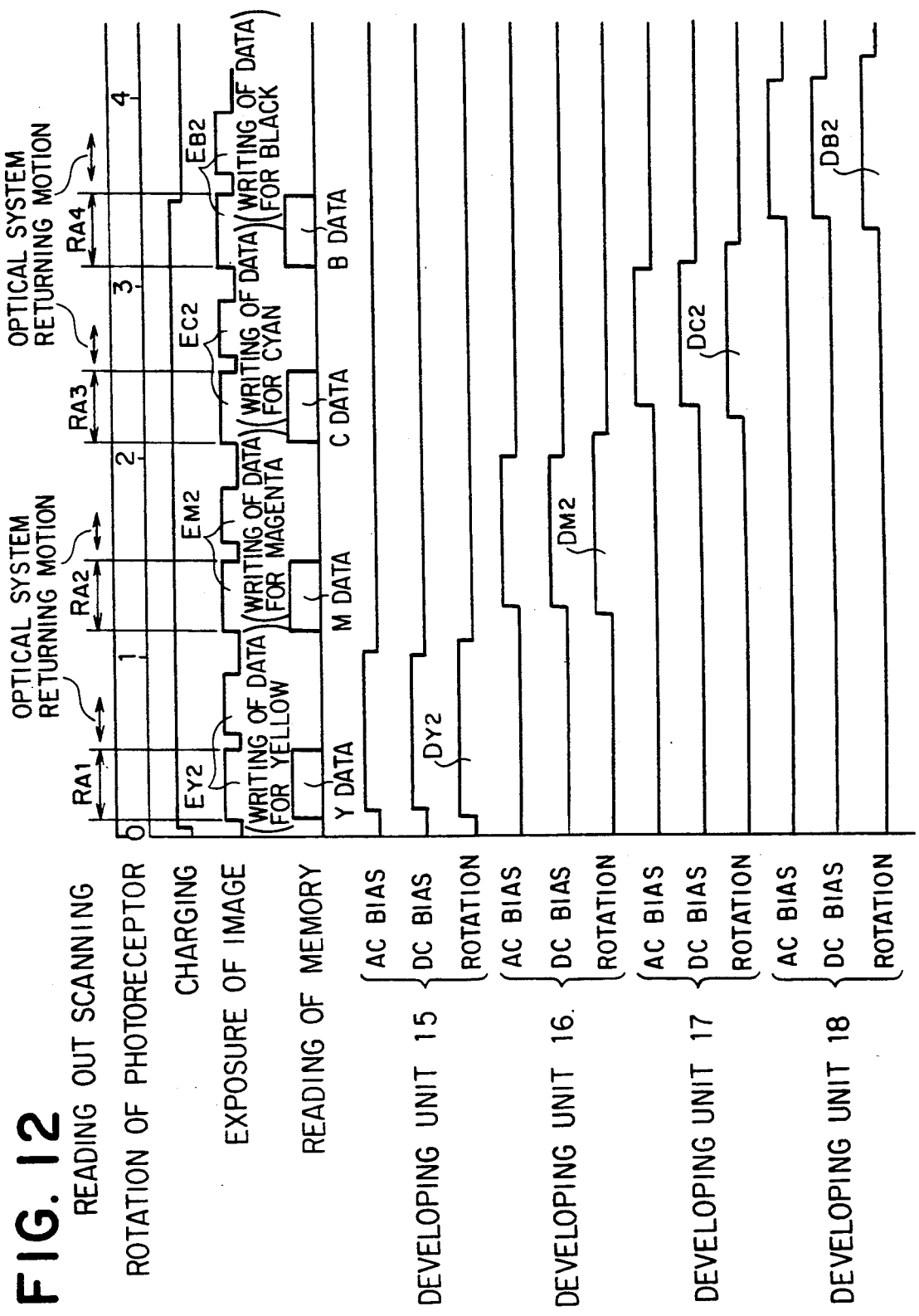
FIG. 12 is a time chart of a multicolor image forming apparatus, wherein a document of A4 size is applied and a memory of the memory unit corresponding to one sheet of A4 document is used.

Referring to FIG. 12, which shows the outline of the color image forming apparatus with an input system in which a document of A4 size is copied. The maximum size of document which the scanner and the printer can process is A3. It is the same equipment as that used in Example 1.

After Y, M, and C, the color components of the images, are color-corrected and the gradation of the image is corrected together with the black component (BK), the color information is inputted into the pattern generator (PG). The color information is processed by the dither method to change the information to digital dot pattern signals and stored in the page memory. At the same moment, the Y dot pattern is outputted to the recording apparatus through the line memory which is needed as a buffer. On the other hand, the Y dot pattern is stored in the frame memory and outputted in synchronization with the rotation of the photoreceptor while the optical system is in a return stroke. In this way, two identical toner images are written and formed on the photoreceptor. In the same way, the M dot pattern, the C dot pattern, and BK dot pattern are extracted from the memory after scanning has been completed three times in synchronization with the writing timing in order to write and form the electrostatic latent images. The latent images are developed and two color toner images are obtained. In this case, only the half of the frame memory for A3 size is utilized.

The system is composed as explained above. According to the method mentioned above, the photoreceptor is used so efficiently that the printing speed of A4 paper becomes twice as fast as the printing speed of A3 paper.

In this way, two electrostatic latent images are formed on the photoreceptor and they are developed by yellow toner. And next this process is repeated according to the magenta data, the cyan data, and the black data. As a result, two multicolor toner images are formed on the photoreceptor, then the toner images are transferred and fixed. The third copy and fourth copy, fifth and sixth and so on can be serially printed in pairs.

EXAMPLE 3

Figure 13:
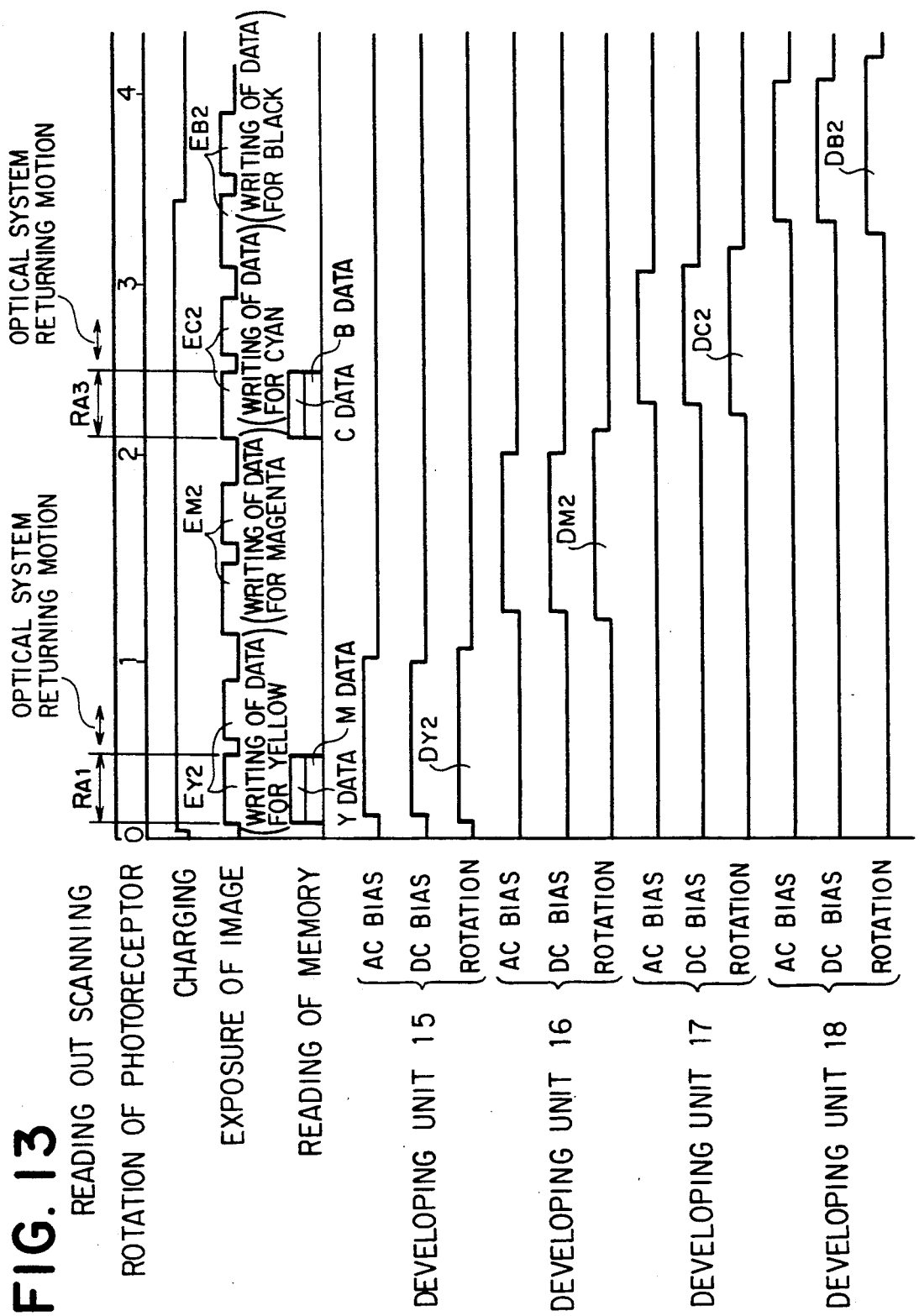
FIG. 13 is a time chart of a multicolor image forming apparatus, wherein a document of A4 size is applied and a memory of the memory unit corresponding to two sheets of A4 document is used.

Referring to FIG. 13, the outline of a color image forming process with an input system in which a document of A4 size is used, will be explained as follows. The maximum size of paper which the image scanner and the printer can process is A4 size. The scanner and the printer are the same machines as those used in Example 1.

After Y, M, and C, the color images, are color-corrected and their gradation is corrected together with the black component (BK), the color information is inputted into the pattern generator (PG). In the pattern generator, the color data is processed by the dither method and changed into the digital dot pattern signals. The dot patterns of two colors are stored in the page memory and the Y dot pattern is outputted to the recording apparatus through a necessary line memory as a buffer.

On the other hand, the Y dot pattern and the magenta dot pattern has been stored in the frame memory. The two same yellow images are written and formed on the photoreceptor in synchronization with the rotation of the photoreceptor while the optical system is in a return stroke. Then the M dot pattern is called from the frame memory and the two identical magenta images are written and formed in synchronization with the second rotation of the photoreceptor. In the same way, the writing of the C dot pattern by the second scanning of the scanning system, and the storage of the C dot and the BK dot pattern in the frame memory is conducted. In the same way, the C dot pattern and the BK dot pattern are taken out from the memory in order, in synchronization with the writing timing and then they are written to form electrostatic latent images on the photoreceptor to be developed. In this way, two-color toner images are formed. In this case, the frame memory of A3 size is divided into two and the divided memory stores data of each color image.

The composition of the system has been summarized above. According to the method mentioned above, it is adequate to scan only twice for the purpose, and the photoreceptor can be used effectively. Furthermore, the printing speed for A4 size becomes twice as fast as that of A3 size paper.

Electrostatic latent images consisting of two frames of image are formed on the photoreceptor. In the next process, the latent images are developed by yellow toner. Two multicolor-toner images are formed on the photoreceptor by repeating this process to the magenta data, the cyan data, and the black data. In the next process, the toner images are transferred and fixed. The third and fourth print, fifth and sixth and so on can be printed in this way.

In the example mentioned above, the order to form color images is not specific. For example, the order to form color images can be changed to black, yellow, magenta, cyan, and the like. In that case, the color image data are transmitted and stored in the frame memory due to the order of color image forming.

Furthermore, this invention can be applied to monochrome image forming, for instance black image forming. Since this apparatus has a function to store the image data corresponding to one frame image, in the case of copying a document the length of which is a little smaller than the circumference of the photoreceptor, the writing of the readout image data directly or after being processed and the writing of the image data according to the stored information are conducted alternately. In this way, copying a document of large size can be carried out by a compact apparatus at a high speed.

EXAMPLE 4

The outline of a color image forming process will be explained as follows, in which a compound copy of functional colors can be obtained from two document sheets of A3 size.

Figure 14:
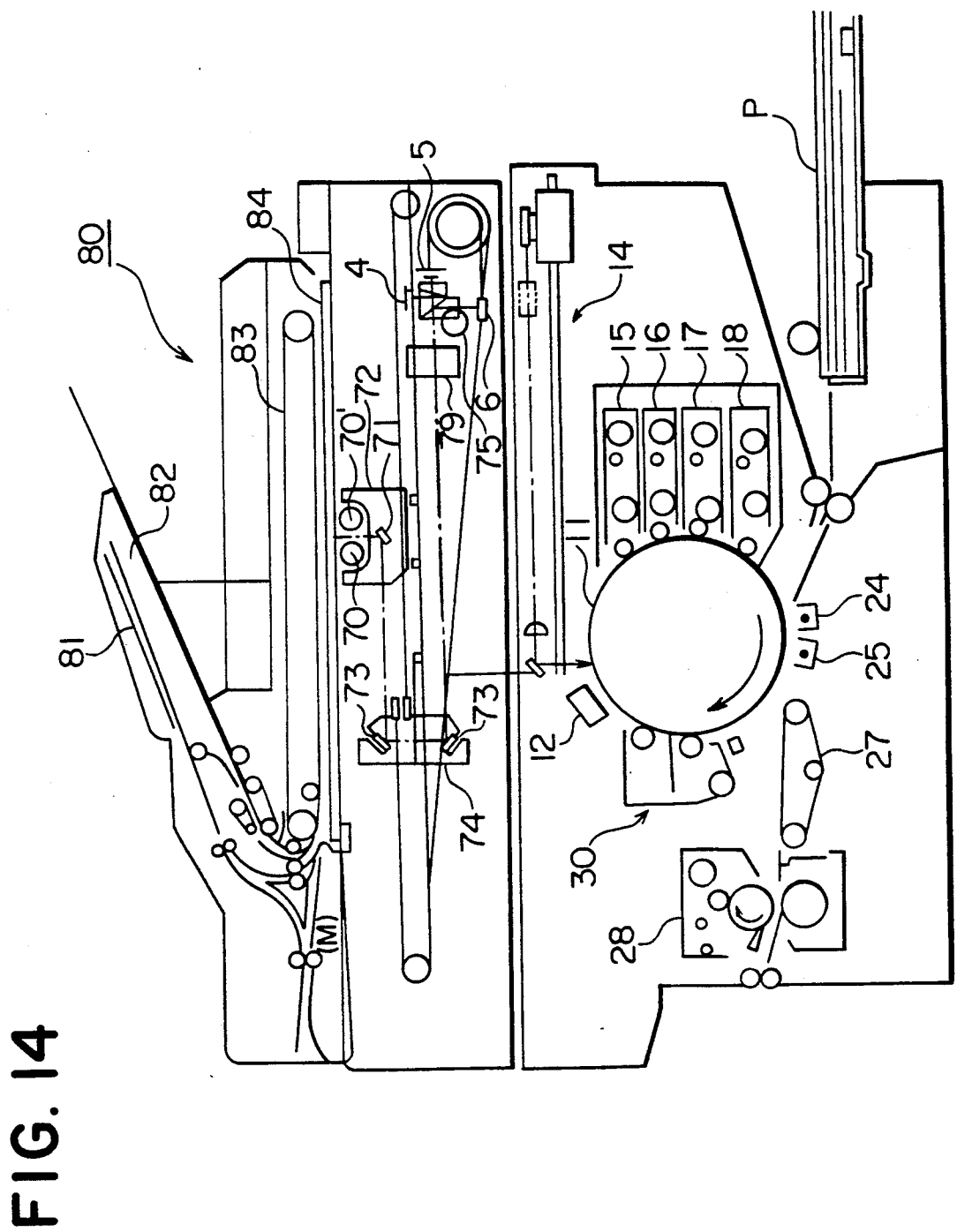
FIG. 14 is a schematic illustration which shows a multicolor image forming apparatus.
Figure 15:
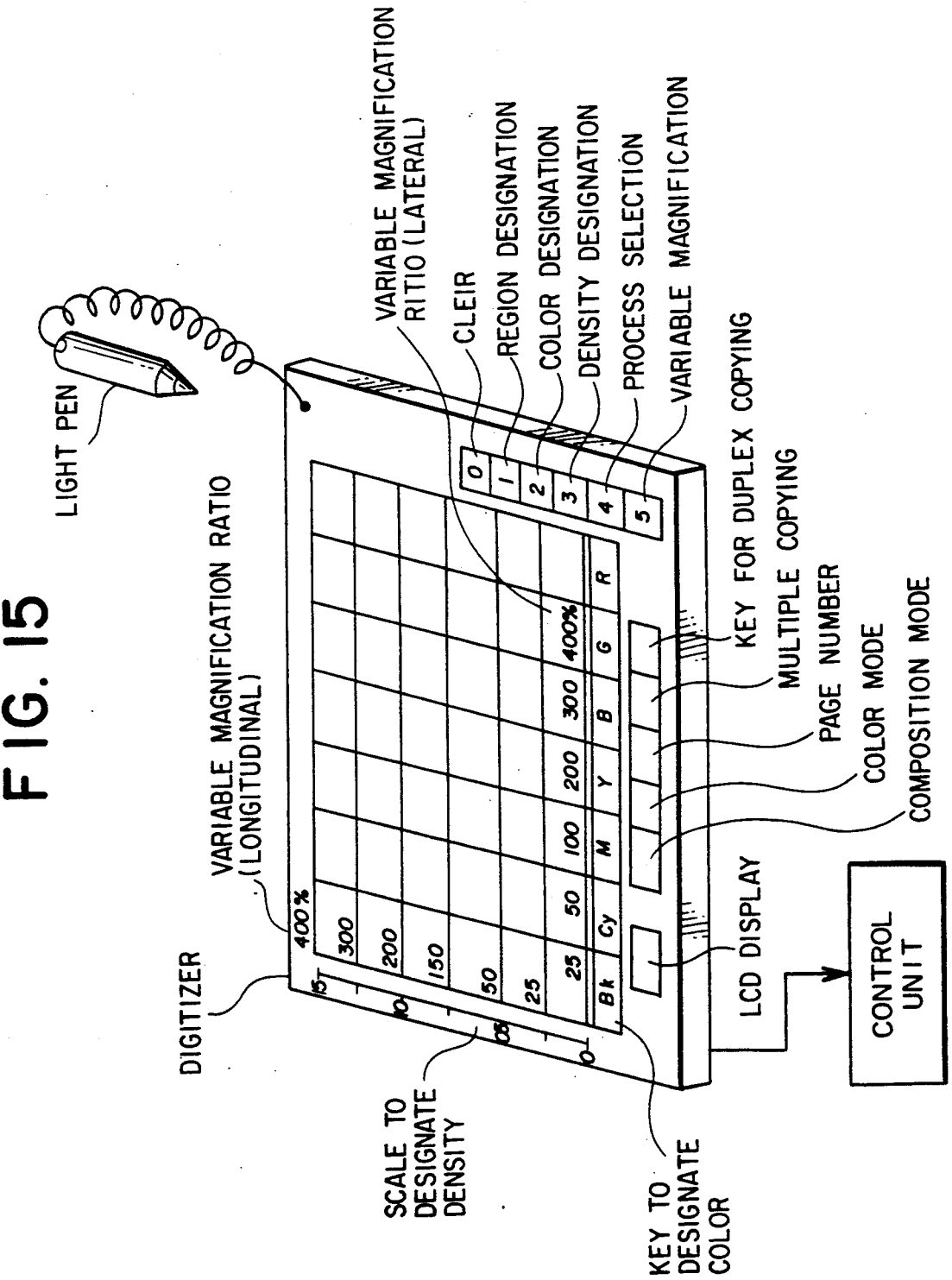
FIG. 15 is a perspective view which shows the digitizer used in the example.
Figure 16:
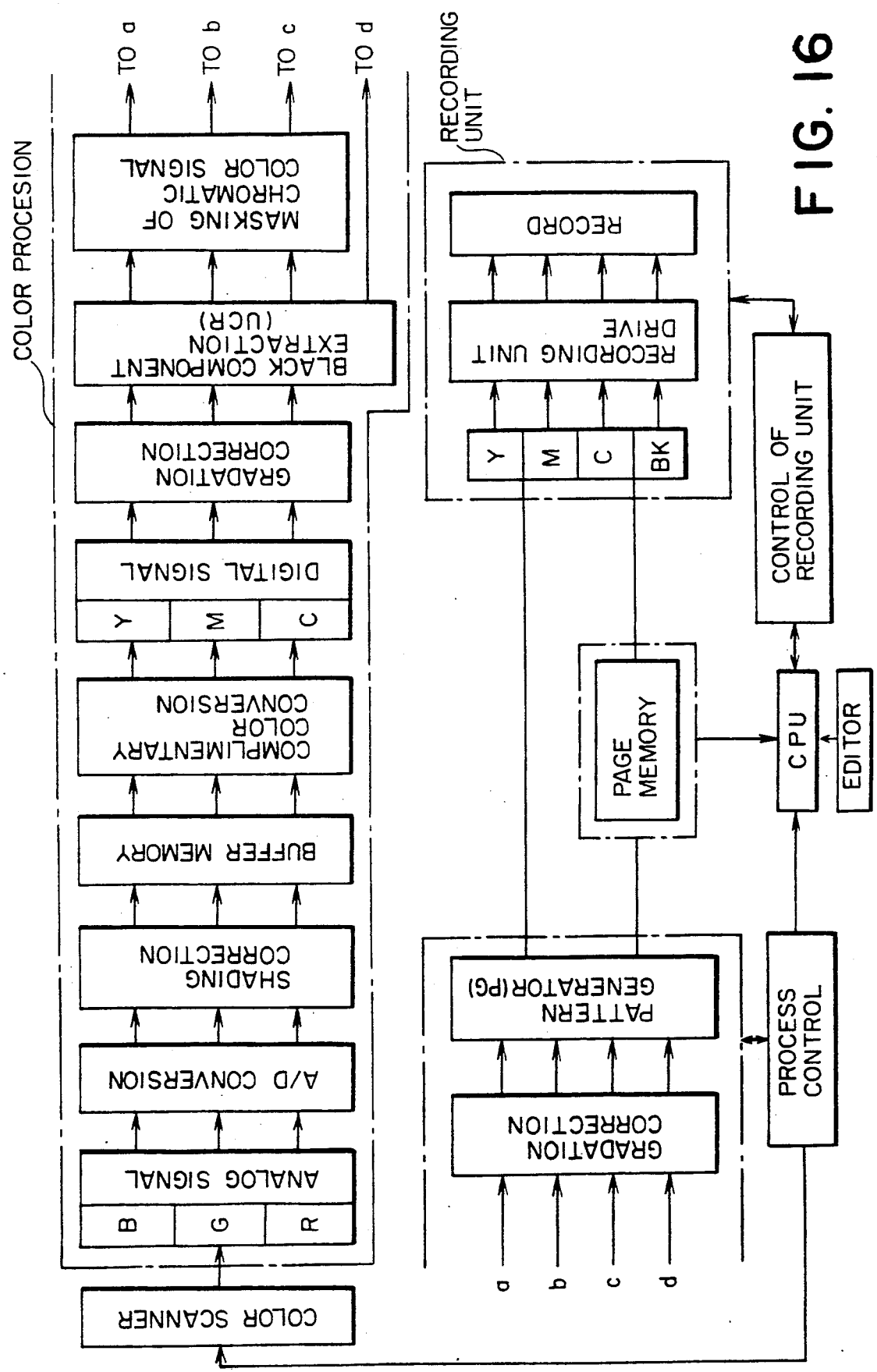
FIG. 16 is a block diagram which shows the outline of image processing in color image processing circuits in the present invention.
Figure 17:
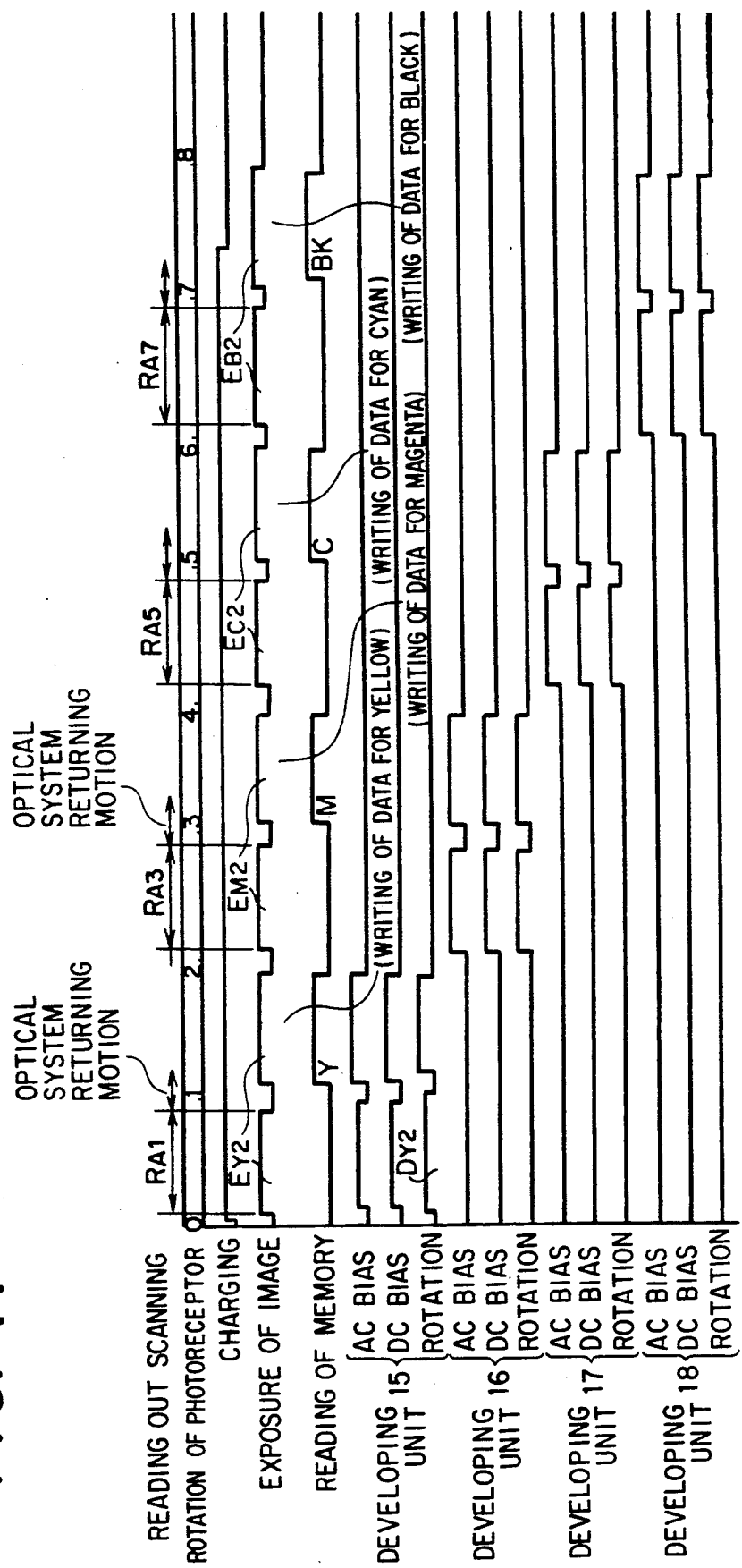
FIG. 17 is a time chart of a multicolor image forming apparatus, wherein a document of A3 size is applied.
Figure 18:
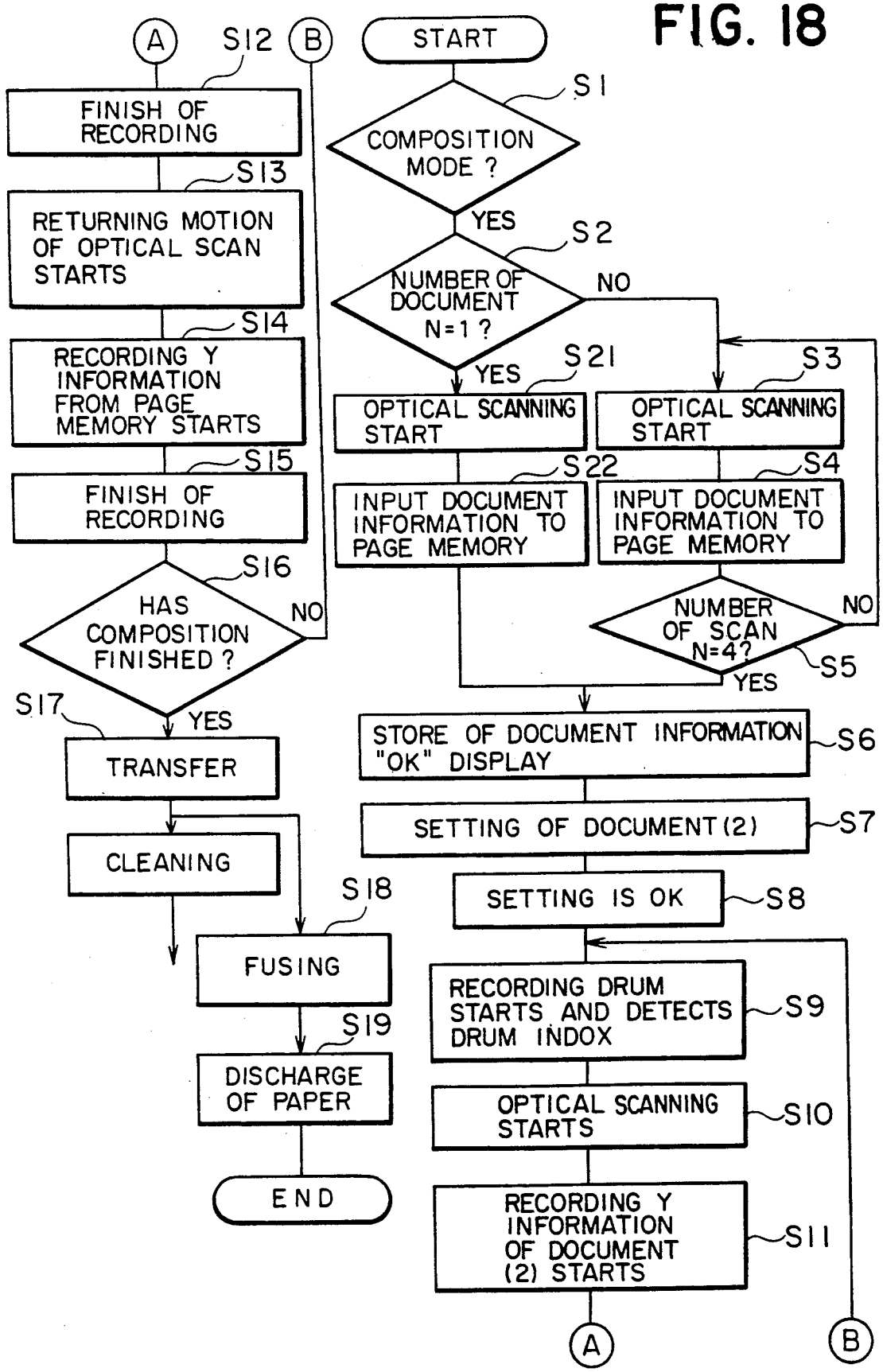
FIG. 18 is a flow chart in a multicolor image forming apparatus, wherein a document of A3 size is applied.
Figure 19A:
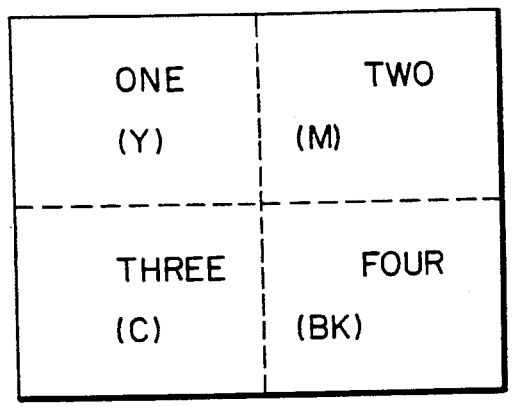
FIG. 19A and FIG. 19B show documents of A3 size from which a composite copy is made.
Figure 19B:
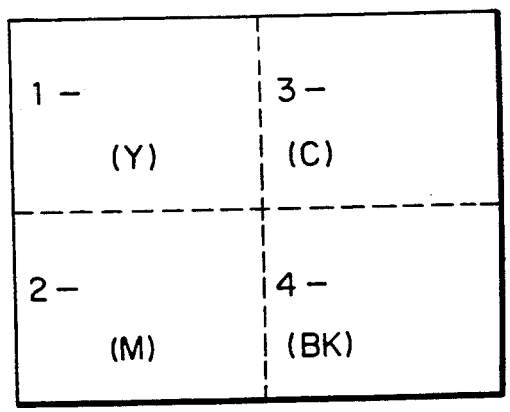
Figure 19C:
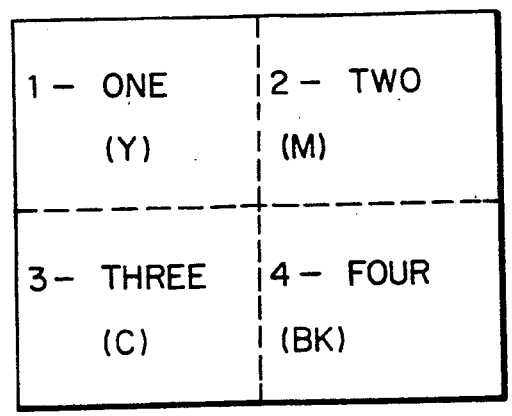
FIG. 19C is a functional color composite copy.

FIG. 14 is a sectional view of the multicolor image forming apparatus to explain the example. FIG. 15 is a perspective view of a digitizer used in this example. FIG. 16 is a block diagram which shows the outline of the process in the color image processing circuit of this example. FIG. 17 is a time chart in the case a composite color copy by functional colors is made from two document sheets of A3 size. FIG. 18 is a flow chart in the case a composite color copy by functional colors is made from two document sheets of A3 size. FIG. 19A and FIG. 19B show documents of A3 size to be made a composite color copy. FIG. 19C shows a composite copy by functional colors.

The multicolor image forming apparatus applied to this example is equipped with a digitizer which designates an optional region and designates a color for the designated region, and with an ADF (Automatic Document Feeder) which can automatically feed a document to the readout position on the platen 84. The structure of the apparatus of this example is the same as that of other examples.

The process of forming a color copy by this multicolor image forming apparatus will be explained as follows. The color region to be copied are designated beforehand on a document. A plurality of color separation information (color density information) which was obtained by color separation of the first document is stored in the page memory after converted into plural color image signals. A plurality of color separation information (color density information) which was obtained by color separation of the second document, is converted into plural color image recording signals, and the writing according to each color recording signal on to the photoreceptor is conducted in the mode of one color per one revolution of photoreceptor. The photoreceptor drum is rotated to develop each color by the developing unit which contains the toner corresponding to the color. The above-described process is repeated for each color. After the images of all the colors have been developed on the photoreceptor surface, the images are transferred and fixed to form color images on a recording paper.

In FIG. 14, the photoreceptor 11 is a drum made from selenium, the diameter of which is 140 mm and it rotates at a linear speed of 140 mm/sec. A uniform electric charge is given to the surface of the photoreceptor 11 by the scorotron charger 12. For example, a uniform electric charge of +800 V is given. An electrostatic latent image is formed on the photoreceptor by an exposure means.

The semiconductor laser unit 14 shown in FIG. 5 is used as the exposure means. The first electrostatic latent image is formed on the photoreceptor by being exposed to laser beam L coming from the laser unit 14. Exposure is serially conducted on the photoreceptor 11 according to the data sent from the page memory.

Details of the semiconductor laser unit 14 are shown in FIG. 6.

Referring to FIG. 16, the outline of a color image forming system with an input system will be described as follows.

Although the structure of the color image forming system of this example is almost the same as that shown in FIG. 9, an editor is attached as mentioned above.

In this example, the digitizer shown in FIG. 15 is adopted as the editor. The digitizer has the function of designating and selecting the copying regions, colors, density, modes, and the like. Therefore, it can edit images very efficiently. The color mode can be selected by pressing the process selecting button and either one-color mode, two-color mode or three-color mode can be selected. Duplex copying, multiple copying, and repeat printing can also be selected.

The digitizer can designate the copying color out of Bk, Cy, M, Y, B, G, and R.

The following is the explanation of an example of the present invention in which a sheet of functional color copy is composited from two documents of A4 size.

Color documents of A3 size to be made a composite copy are shown in FIG. 19A and FIG. 19B. The regions of Y, M, C, and BK are surrounded by dotted lines. In the drawings, (Y), (M), (C), and (BK) show the colors of the toner in the developer which is used to develop the electrostatic latent image on the surface of the photoreceptor. In FIG. 19C, (Y), (M), (C), and (BK) show the colors of the toner in the developer which was used to develop the electrostatic latent image. Since the document to make a composite copy is of functional colors, the composite copy may be monochrome or full color.

First of all, the composite copy button is pressed to select the composite copy mode. Then, the mode selecting button 1 is pressed to select the mode of designating the region. After that, the document shown in FIG. 19A is placed upward on the operation surface of the digitizer. The region can be designated by designating the position indicated by the dashed lines on the document. After the mode selecting button 2 and density selecting button 3 have been pressed to select the mode designating a color, the color designating key on the operation surface is touched by a light pen to designate the color of the above-described designated region. As described above, the color is designated for the region surrounded by dashed lines on the document shown in FIG. 19A. By the same procedure, the color is also designated for the region surrounded by dotted lines on the document shown in FIG. 19B. As described above, the region is designated for each color by which two document sheets of A3 size are reproduced.

In the flow chart shown in FIG. 18, and referring to the block diagram in FIG. 16 explaining the outline of color image processing, the procedure to read out color density information from the first document of A3 size will be explained.

First of all, a document sheet is put upon another document sheet and they are set on the document tray 81 of RDF80. At this stage, confirmation is made that the apparatus is set to the composite mode. When the apparatus is set to the composite mode (S1), whether the document color designated by the above-described procedure is monochromatic or not, is confirmed (S2). The recording apparatus, the dot pattern memory, and the image forming process are controlled according to the signal from CPU. For example, in FIG. 14, colors of the reflected light image from the document are separated with the movement of the exposing system (the lamps 70, 70' and the mirrors 71, 72, 73), and the three CCD image sensors 4, 5, 6 read out the lateral color information of B (blue), G (green), and R (red) from the document to output analog video signals (S3).

As shown in FIG. 16, after these video signals have gone through A/D conversion, shading correction is conducted to eliminate distortion in the color information or caused by the optical system. The video signals are temporarily inputted to the buffer memory in order to enable B, G, and R correspond with the same image positions. In the next stage, the signals of B, G, and R from the buffer memory are converted in the complimentary colors of Y (yellow), M (magenta), and C (cyan), and the correction for gradation is conducted. Then, the black component is extracted (UCR) from the data of Y, M, and C to separate into the color component and the non color component (black).

The colors of Y, M, and C, the chromatic color components, are corrected and the correction for gradation is conducted with the black component (BK). After that, the signals of Y, M, and C are inputted into the pattern generator (PG). At the pattern generator, dither processing is conducted on the signals and the processed signals are converted in to digital dot pattern signals and written in the page memory (S4). Even when the document consists of a plurality of colors, the signals are written into the page memory by one scanning. In this case, the digital dot patterns reproducing designated region in designated color are written according to the information inputted beforehand from the digitizer.

After the document information of the first page is written into the page memory according to the above-described procedure, "OK" is displayed on the LCD display of the digitizer (S6).

In the case the color of the document is monochromatic although this case is not explained in the example, the document is scanned once by the above-described optical system and the above-described color image processing is conducted. Then, the digital dot pattern signals of the document are written into the page memory (S21, S22).

In the case of a plurality of colors, as shown in the flow chart in FIG. 18, scanning is conducted as many times as the number of the colors designated by the above-described digitizer. Then, the density information of the document may be written into the page memory at every region designated according to the reproduced color.

FIG. 17 is a time chart which shows the movement of each piece of equipment to make a composite copy after the document (2) has been set. Referring to the time chart in FIG. 17 and the flow chart in FIG. 18, the procedure to obtain a functional color composite copy will be explained, wherein the writing of the image information (density information) of the second document after being processed (or without being processed) and the writing of the image density information of the first document which has been stored once in memory, are conducted alternately.

In RDF80 (Recycling Document Feeder), after the first document placed at the readout position on the platen 84 has been delivered, the second document is fed to the platen 84 from the document tray 81 and placed at the readout position on the platen 84 (S7). At this moment, "OK" is displayed on the LCD display of the digitizer which means that the second document has been placed correctly at the readout position on the platen 84 (S8).

As described before, the recording apparatus, the dot pattern memory, and the image forming process are driven and controlled by the controlling signal from the CPU. Then the photoreceptor drum starts rotating, and the drum index signal which is the standard signal to make a composite copy is generated a detected. According to the signal, the read out system to scan the document starts, moving, and writing by the laser unit also starts in synchronization with the scanning. A video signal is outputted from the CCD in the scanner and sent to the processing unit.

As shown in FIG. 16, after this video signal has been treated through A/D conversion, shading correction is conducted to eliminate distortion in the color information or caused by the optical system, and the like. The signal is temporarily inputted into the buffer memory in order to make B, G, and R image correspond with the same image positions. In the next stage, the B, G, and R signals from the buffer memory are converted in to the complimentary colors of Y (yellow), M (magenta), and C (cyan), and the gradation correction is carried out. Then, the black component is extracted (UCR) from the data of Y, M, and C to separate into the chromatic colors and the non colors. The colors of Y, M, and C which are the chromatic color components, are corrected and gradation correction is conducted together with the black component (BK). After that, the signals are inputted to the pattern generator (PG). In this stage, dither processing is conducted to change the signals to the digital dot pattern signals and writing is conducted. In the case of Y dot pattern signals to be written first, the situation is different from that of reading out the first document aforementioned. The signals are not stored in the page memory and outputted directly to the recording apparatus through the line memory which is necessary as a buffer. Writing and forming images are conducted almost synchronously with reading out (S11).

On the other hand, the M dot pattern is stored in the page memory of A3 size. Writing and forming images of the M dot pattern is conducted (S14, S15) in synchronization with the rotation of the photoreceptor while the optical system is on the return stroke (S13).

By repeating the processes S9 to S16, writing the C dot pattern and storing the BK dot pattern in the page memory are conducted almost in synchronization with reading out. The BK dot pattern is written in exact timing with the movement of the photoreceptor when the optical system is on the return stroke.

The functional color composite toner image formed on the photoreceptor 11 is transferred (S17) by the transfer unit 25 onto a recording paper conveyed from the recording paper tray P. The recording paper with composite toner images is conveyed by the belt 27 to the fixing unit 28 and fixed (S18). Then, the recording paper is delivered (19) to the delivery tray which is not shown in the drawing. In this way, all the processes are completed.

The system is composed as described above. The circumference of the photoreceptor can be shortened by a length corresponding to the time needed for the optical scanning system to return to its starting position.

A time chart for a document of A3 size is shown in FIG. 17. In FIG. 17, each means at high level is driven. In the same way as FIG. 10, $EY_2$, $EM_2$, $EC_2$, and $EB_2$ are timing information for yellow and magenta which was read out in $RA_1$ and the information about cyan and black which was read out in $RA_3$, and written by the exposure means. According to the information, yellow, magenta, cyan, and black are developed by the developing units 15, 16, 17, 18 at the time of $DY_2$, $DM_2$, $DC_2$, and $DB_2$.

Accordingly, as shown in the time chart in FIG. 17, in the case of a document of A3 size, after the photoreceptor drum has been conducted image scanning and exposure in the first revolution, the optical system returns to its starting position while the photoreceptor is in the second revolution and is exposed according to the image data from the page memory. In other words, image read out scanning is conducted once and image exposure is conducted twice while the photoreceptor makes two revolutions. A functional color composite copy which is shown in FIG. 19C can be obtained in this way.

In the example described above, the order of forming of color images is not specific. For instance, the order may be changed to black, yellow, magenta, and cyan. In this case, the image data of each color to be transmitted and the image data of each color to be stored in the page memory are changed according to the order of color image forming.

Moreover, the present invention can be applied to monochrome image forming. The apparatus of the present invention has the function to store image data corresponding to an image frame. Therefore, even when an image the length of which is a little smaller than the circumference of the photoreceptor is copied, copying can be conducted at a high speed by the method explained as follows. Writing the readout image information after being processed or not processed and writing according to the information which was once stored in the page memory, are conducted alternately. The apparatus can be made compact and copy at high speed by adopting this method.

EFFECT OF THE INVENTION

According to the present invention, compared with the circumference of the photoreceptor, the length of the image is quite short. As a result, the problem is solved that a pretty long empty portion on the photoreceptor can be eliminated. Accordingly, the circumference of the photoreceptor can be shortened and printing can be carried out more quickly. Furthermore, the apparatus can be made compact. As described above, the multicolor image forming apparatus of the present invention has many advantages.

What is claimed is:

1. A method for reproducing a color image on a document on a recording sheet, comprising the steps of:
   providing an image reading means for generating a plurality of color component signals corresponding to the color image;
   moving the image reading means along the document in an outward direction from an initial position to photoelectrically read the color image while an image carrying means, having a rotatable endless imaging surface, rotates through a first rotation;
   writing a first color component image, corresponding to a first one of the plurality of color component signals, onto the imaging surface while the image carrying means rotates through the first rotation;
   storing a second one of the plurality of color component signals in a memory means while the image carrying means rotates through the first rotation;
   moving the image reading means in a backward direction to the initial position without reading the color image while the image carrying means rotates through a second rotation; and
   writing a second color component image, corresponding to the second one of the plurality of color component signals which is stored in the memory means, onto the imaging surface while the image carrying means rotates through the second rotation.

2. The method of claim 1, wherein the step of writing the first color component image includes a step of writing the first color component image onto the imaging surface twice while the image carrying means rotates through the first rotation and the step of writing the second color component image includes a step of writing the second color component image onto the imaging surface twice while the image carrying means rotates through the second rotation, to form two copies of the color image on the imaging surface.

3. A method for reproducing a color image on a document on a recording sheet, comprising the steps of:
   providing an image reading means for generating a plurality of color component signals corresponding to the color image;
   moving the image reading means along the document in an outward direction from an initial position to photoelectrically read the color image while an image carrying means, having a rotatable endless imaging surface, rotates through a first half rotation;
   moving the image reading means in a backward direction to the initial position without reading the color image while the image carrying means rotates through a second half rotation;
   writing a first color component image, corresponding to a first one of the plurality of color component signals, onto the imaging surface while the image carrying means rotates through the first half rotation;
   storing the first one and a second one of the plurality of color component signals in a memory means while the image carrying means rotates through the first half rotation;
   writing the first color component image, corresponding to the first one of the plurality of color component signals which is stored in the memory means, onto the imaging surface while the image carrying means rotates through the second half rotation;
   writing a second color component image, corresponding to the second one of the plurality of color component signals which is stored in the memory means, onto the imaging surface while the image carrying means rotates through another first half rotation; and
   writing the second color component image onto the imaging surface while the image carrying means rotates through another second half rotation.

4. A method for producing a color image on the recording sheet by superposing reproductions of a color image on a first document and a color image on a second document, comprising the steps of:
   scanning the first document with an image reading means for generating a plurality of first color component signals corresponding to the color image on the first document;
   storing the first color component signals in a memory means;
   scanning the second document with an image reading means for generating a plurality of second color component signals corresponding to the color image on the second document, the step of scanning the second document including the step of moving the image reading means along the second document in an outward direction from an initial position to photoelectrically read the color image of the second document while an image carrying means, having a rotatable endless imaging surface, rotates through a first rotation;
   writing a second color component image, corresponding to one of the second color component signals, onto the imaging surface while the image carrying means rotates through the first rotation;
   moving the image reading means in a backward direction to the initial position without reading the color image of the second document while the image carrying means rotates through a second rotation; and
   writing a first color component image, corresponding to one of the first color component signals stored in the memory means, onto the imaging surface while the image carrying means rotates through the second rotation.

* * * * *